United States Patent
Chavan et al.

(10) Patent No.: US 11,301,368 B1
(45) Date of Patent: Apr. 12, 2022

(54) INTEGRATED TEST ENVIRONMENT AVAILABILITY SYSTEM AND METHODS

(71) Applicant: T-MOBILE INNOVATIONS LLC, Overland Park, KS (US)

(72) Inventors: Raju Chavan, Overland Park, KS (US); Aaron Ray Haehn, Olathe, KS (US); Bradley Martin Korber, Flower Mound, TX (US); Yuh-Feng Sunny Rutherford, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 11 days.

(21) Appl. No.: 16/989,548

(22) Filed: Aug. 10, 2020

(51) Int. Cl.
| | |
|---|---|
| *G06F 9/44* | (2018.01) |
| *G06F 11/36* | (2006.01) |
| *G06F 9/455* | (2018.01) |
| *G06F 11/30* | (2006.01) |
| *G06F 11/07* | (2006.01) |
| *G06F 11/32* | (2006.01) |

(52) U.S. Cl.
CPC ...... *G06F 11/3688* (2013.01); *G06F 9/45504* (2013.01); *G06F 11/076* (2013.01); *G06F 11/301* (2013.01); *G06F 11/328* (2013.01); *G06F 11/3692* (2013.01)

(58) Field of Classification Search
CPC ............ G06F 11/3688; G06F 9/45504; G06F 11/076; G06F 11/301; G06F 11/328; G06F 11/3692
See application file for complete search history.

(56) References Cited

U.S. PATENT DOCUMENTS

| | | | | |
|---|---|---|---|---|
| 2008/0115114 A1* | 5/2008 | Palaparthi | ........... | G06F 11/3688 717/128 |
| 2008/0120602 A1* | 5/2008 | Comstock | ........... | G06F 11/3688 717/125 |
| 2012/0204153 A1* | 8/2012 | Peterson | ............ | G06F 11/3672 717/124 |
| 2012/0297367 A1* | 11/2012 | Mujeeb | ............... | G06F 11/3688 717/125 |
| 2013/0191543 A1* | 7/2013 | Abbondanzio | ......... | H04L 41/00 709/226 |
| 2013/0212434 A1* | 8/2013 | Janky | ...................... | H04L 43/50 714/27 |
| 2014/0026122 A1* | 1/2014 | Markande | ........... | G06F 11/3688 717/124 |

* cited by examiner

*Primary Examiner* — Hang Pan (57) ABSTRACT

A test environment availability system is disclosed that comprises test servers that include JAVA virtual machines (JVMs), applications executing on the JVMs, and monitoring tools. The system comprises a server including an application that receives a mapping of each function to applications executing on one or more of the test servers that enable an end-to-end journey of the function, obtains operational statuses of the JVMs and the applications on the test servers from the monitoring tools, coalesces each of the operational statuses with a corresponding function based on the mapping to create a coalesced operational statuses mapping, applies a rules set to the coalesced operational statuses mapping, determines whether each function is operational based on the application of the rules set, and creates and provides a dashboard based on the determination that illustrates each function and each function's operational status to an electronic device for display on the electronic device.

18 Claims, 5 Drawing Sheets

| Channel: Digital - Web | | Environment – RTB1 | | Journey: Make Payment |
|---|---|---|---|---|
| Channel | Category | Journey | Impacted App ID | App Availability |
| Digital | Care | Payment Method (4.0) | Mule | Up and Running |
| Digital | Care | Payment Method (4.0) | HJS(ATG) | Up and Running |
| Digital | Care | Payment Method (4.0) | EAI | Not Available |
| Digital | Care | Payment Method (4.0) | Amdocs | Up and Running |

INTEGRATED TEST ENVIRONMENT AVAILABILITY SYSTEM AND METHODS

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A test environment includes hardware and software. A test environment creates a space that allows performance of test executions of an application or component. Applications or components are typically tested in a test environment prior to initiating execution in a production environment.

SUMMARY

In an embodiment, a method for test environment availability is disclosed. The method comprises monitoring, by a plurality of monitoring tools, a plurality of JAVA virtual machines (JVMs) on a plurality of test servers in a plurality of test environments and one or more applications executing on each of the plurality of JVMs to determine operational statuses of the one or more JVMs and the one or more applications. The method also comprises receiving, by an application stored on a non-transitory memory of a server and executable by a processor of the server, a mapping of each function of a plurality of functions to a plurality of applications executing on one or more of the plurality of test servers that enable an end-to-end journey of the function and obtaining, by the application, the operational statuses of the one more JVMs and the one or more applications on each of the plurality of test servers from the one or more monitoring tools on each of the plurality of test servers. The method additionally comprises coalescing, by the application, each of the operational statuses of one more JVMs and the one or more applications on each of the plurality of test servers with a corresponding function based on the mapping to create a coalesced operational statuses mapping and applying, by the application, a set of rules to the coalesced operational statuses mapping. The set of rules comprises a rule for at least one function that specifies a predefined number of operational JVMs needed in order for the at least one function to be deemed operational. The method further comprises determining, by the application, whether each of the plurality of functions is operational based on the application of the set of rules and creating and providing, by the application, a dashboard based on the determination that illustrates each function and an operational status of each function to an electronic device for display on the electronic device. The method also comprises prior to testing a new application in a testing environment of the plurality of testing environments, displaying, on a display of the electronic device, the dashboard. The new application comprises one or more of the plurality of functions and the operational status of each of the one or more plurality of functions is verified to be operational based on the dashboard. The method additionally comprises testing the new application in the testing environment based on the verification that each of the one or more of the plurality of functions is operational using the dashboard.

In another embodiment, a test environment availability system is disclosed. The system comprises a plurality of test servers in a plurality of test environments. Each test server of the plurality of test servers comprises one or more JAVA virtual machines (JVMs), one or more applications executing on the one or more JVMs, and one or more monitoring tools associated with the one or more JVMs. The one or more monitoring tools monitor the one or more JVMs and the one or more applications to determine operational statuses of the one or more JVMs and the one or more applications. The system also comprises a server that comprising a processor, a non-transitory memory, and an application stored in the non-transitory memory, that when executed by the processor, receives a mapping of each function of a plurality of functions to a plurality of applications executing on one or more of the plurality of test servers that enable an end-to-end journey of the function, obtains the operational statuses of the one more JVMs and the one or more applications on each of the plurality of test servers from the one or more monitoring tools on each of the plurality of test servers, and coalesces each of the operational statuses of one more JVMs and the one or more applications on each of the plurality of test servers with a corresponding function based on the mapping to create a coalesced operational statuses mapping. The application also applies a set of rules to the coalesced operational statuses mapping. The set of rules comprises a rule for at least one function that specifies a predefined number of operational JVMs needed in order for the at least one function to be deemed operational. The application further determines whether each of the plurality of functions is operational based on the application of the set of rules, and creates and provides a dashboard based on the determination that illustrates each function and an operational status of each function to an electronic device for display on the electronic device.

In yet another embodiment, a method for test environment availability is disclosed. The method comprises monitoring, by a plurality of monitoring tools, a plurality of JAVA virtual machines (JVMs) on a plurality of test servers in a plurality of test environments and one or more applications executing on each of the plurality of JVMs to determine operational statuses of the one or more JVMs and the one or more applications. The method also comprises receiving, by an application stored on a non-transitory memory of a server and executable by a processor of the server, a mapping of each function of a plurality of functions to a plurality of applications executing on one or more of the plurality of test servers that enable an end-to-end journey of the function and obtaining, by the application, the operational statuses of the one more JVMs and the one or more applications on each of the plurality of test servers from the one or more monitoring tools on each of the plurality of test servers. The method additionally comprises coalescing, by the application, each of the operational statuses of one more JVMs and the one or more applications on each of the plurality of test servers with a corresponding function based on the mapping to create a coalesced operational statuses mapping and applying, by the application, a set of rules to the coalesced operational statuses mapping. The set of rules comprises a rule for at least one function that specifies a predefined number of operational JVMs needed in order for the at least one function to be deemed operational. The method further comprises determining, by the application, whether each of the plurality of functions is operational based on the application of the set of rules and creating and providing, by the application, a dashboard based on the determination that illustrates each function and an operational status of each function to an electronic device for display on the electronic device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Test environments are used to test applications prior to executing the application in a production environment. In a test environment, a function may be provided by a plurality of independent computers or testing servers, a plurality of independent JAVA virtual machines (JVMs), and/or a plurality of independent applications. It can be difficult to know, when undertaking to test an application that includes different functions, whether all the needed backend pieces (e.g., test servers, JVMs, applications, etc.) that enable those functions are in place and working properly. Sometimes it is more complicated in that a function may need multiple instances of a computer system to be executing—for example a predefined number of JVMs executing at once—in order for the function to be deemed in place and working properly. Commonly each of the backend pieces of the test environments are monitored separately, and therefore it is difficult to know if the whole end-to-end journey of a function is enabled. The pending application is directed to an integrated test environment availability system that provides a dashboard illustrating a comprehensive view of the operational statuses of functions as well as the operational statuses of the underlying test environment components that enable those functions such that it can be easily assessed whether the end-to-end journey of each function is operational.

The integrated test environment availability system includes a plurality of testing servers in a plurality of different testing environments. Each testing server may include one or more JVMs and one or more applications executing on the JVMs as well as one or more monitoring tools that monitor the operational statuses of the JVMs and applications. A mapping of each function to the underlying test server(s) and application(s) that enable the end-to-end journey of the function is determined. An application on a server in the integrated test environment availability system may coalesce this mapping with the operational statuses from each of the monitoring tools and apply a set of rules (e.g., rules that specify a predefined number of JVMs or applications that need to be functioning in order for the function to be deemed operational) to determine whether each function is operational. The application may then create and provide a dashboard that illustrates each function and the operational status of each function to an electronic device for display on the electronic device. A user may select a function in the dashboard to drill down to see each of the underlying applications that enable the end-to-end journey of the function and their operational statuses. The operational statuses of the functions and/or the underlying applications that enable the end-to-end journey of each application in the dashboard may be color coded such that their operational statuses are easily discernable.

The integrated test environment availability system and methods disclosed herein improve testing efficiency. For example, prior to testing an application, the dashboard generated by the integrated test environment availability system can be consulted to confirm that any functions implemented by the application and the underlying applications that enable the functions are operational. In practice, test cases are carried out, results are analyzed, trouble tickets are generated, different persons associated with different trouble tickets work to figure out the source of the errors and try to address those errors. If testing is conducted on a broken test system, all this time and effort is wasted only for the tester to have to start back at the beginning. The integrated test environment availability system and methods discussed herein helps to eliminate this whole wasteful scenario.

The dashboard may also be consulted after testing. If an issue does occur during testing, the dashboard enables a tester to more easily identify the source of the issue (e.g., whether a given issue is a result of the testing environment itself or the application being tested) and escalate the issue, such as through the generation of a trouble ticket, to the proper team. Further, the integrated test environment availability system may provide notification to an environment team if one of the rules fails to be satisfied, thereby driving quicker corrective action and resulting in improved functioning and reliability of the test environments. The comprehensive dashboard provided by the integrated test environment availability system also enables more efficient scheduling of maintenance, updates, or outages for the underlying test environment components, which also contributes to improved functioning and reliability of the test environments.

The integrated test environment availability system discussed herein may be integrated with the testing system(s) themselves. For example, a test management system running the tests may activate the integrated test environment availability system and only start the test if the integrated test environment availability system determines that the functions implemented by an application under test and the underlying applications that enable the functions are operational. The test management system running the tests may monitor and store the statuses provided by the integrated test environment availability system to see the impact different stages of the test has on each of the statuses. The test management system running the tests may monitor the integrated test environment availability system and if an element fails to satisfy one of the rules, the test management system may pause or shut down the test, document the statuses from the test and from the integrated test environment availability system, and initiate a trouble ticket to investigate the problem. The trouble ticket may be prioritized if the underlying function failing for the application under test supports a large number of applications (e.g., more than a threshold number of applications).

While the system and methods discussed herein are with respect to a testing environment, the system and methods could be applied to a production environment without departing from the spirit or scope of the present disclosure. Similar advantages such as increased efficiencies in terms of identifying sources of issues and notifications of issues, quicker corrective action, and more efficient scheduling of maintenance, outages, and/or upgrades may result from implementation of such a system in a production environment. When applied to a production environment, the integrated test environment availability system discussed herein may be integrated with the production system(s) themselves. For example, a production management system may activate the integrated test environment availability system and only start the application in the production environment if the integrated test environment availability system determines that the functions implemented by the application and the underlying applications that enable the functions are operational. The production management system may monitor the integrated test environment availability system and shut down or pause a function where any of the underlying end-to-end support functions being monitored are not operational. This may avoid strange results or more challenging system errors when part but not all of the supporting functions are not behaving in a complex process and allows for a cleaner stop and fewer instances exits that need to be tracked down and repaired. This also gets trouble shooting moving more quickly in the right space knowing something about where and why the failure occurred. A failure may also be prioritized if the underlying function failing for an application supports a large number of applications (e.g., more than a threshold number of applications).

Figure 1:
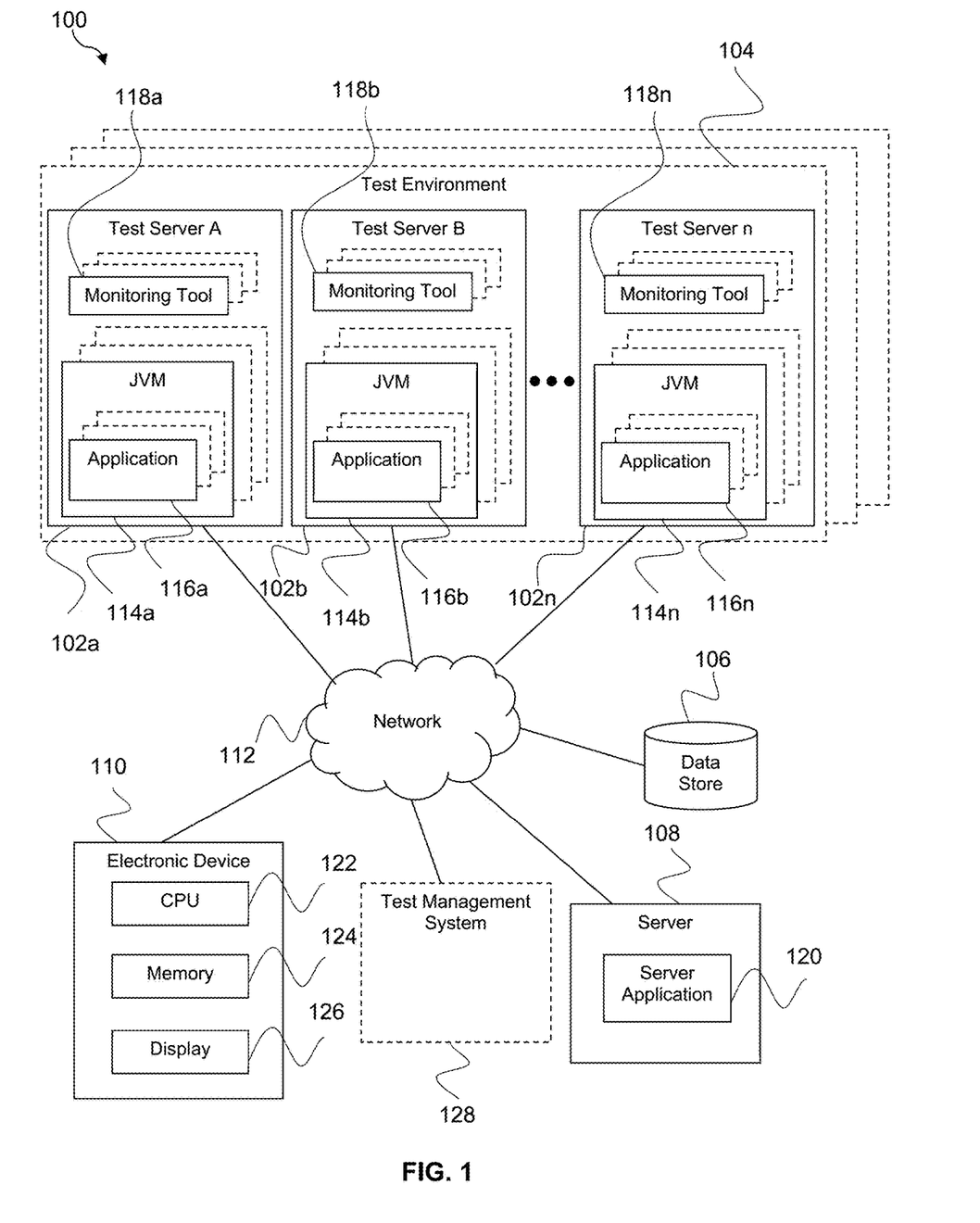
FIG. 1 is a block diagram of a test environment availability system according to an embodiment of the disclosure.

Turning now to FIG. 1, a test environment availability system 100 is described. In an embodiment, the test environment availability system 100 comprises a plurality of test servers 102a-102n in a test environment 104, data store 106, a server 108, an electronic device 110, and a network 112. Each of the test servers 102a-102n may comprise one or more JVMs, one or more applications executing on the one or more JVMs, and one or more monitoring tools. For example, test server 102a may comprise one or more JVMs 114a, one or more applications 116a executing on the one or more JVMs 114a, and one or more monitoring tools 118a, test server 102b may comprise one or more JVMs 114b, one or more applications 116b executing on the one or more JVMs 114b, and one or more monitoring tools 118b, and test server 102n may comprise one or more JVMs 114n, one or more applications 116n executing on the one or more JVMs 114n, and one or more monitoring tools 118n. In some contexts herein, the plurality of test servers 102a-102n, the one or more JVMs 114a-114n, the one or more applications 116a-116n, and the one or more monitoring tools 118a-118n may be referred to as the test servers 102, the JVMs 114, the applications 116, and the monitoring tools 118, respectively.

Each of the monitoring tools 118 may be associated with at least one of the JVMs 114. In an embodiment, the monitoring tools 118 monitor the JVMs 114 and the applications 116 to determine the operation statuses of each of the JVMs 114 and the applications 116. The operational statuses determined by the monitoring tools 118 may be stored locally on the test servers 102 or externally such as in data store 106. Each of the test servers 102 may comprise the same or different monitoring tools 118. The monitoring tools 118 may comprise an off-the-shelf program such as AppDynamics or another monitoring program.

Each of the applications 116 executing on the JVMs 114 on the test servers 102 may support or enable a function by supporting or enabling the end-to-end journey of that function. In an embodiment, the end-to-end journey of a function is all of the applications or functionalities involved in that function from the beginning to the end of the function. For example, a function or transaction may be supported by actions performed by different platforms or different servers. A transaction may involve an application 116 executing on a test server 102 (1) obtaining an Internet Protocol (IP) address from a domain name service (DNS) server, (2) sending a message to an email server, (3) doing a data dip into a home subscriber server (HSS) all to complete the transaction. The journey encompasses the DNS server, the email server, and the HSS. If any of these systems is down in the test environment, the transaction cannot succeed and hence a test case directed to that transaction will fail, independently of the actual rightness or wrongness of the application 116. A mapping of each function to a plurality of the applications 116 executing on one or more of the JVMs 114 that enable the end-to-end journey of the function may be determined. In an embodiment, the mapping is determined based on requirements documents. The mapping may be a manual process, an automated process, or a combination of manual and automated processes. The mapping may be stored in a data store such as in data store 106. A developed application may include one or more of these mapped functions. Some non-limiting, exemplary functions in the telecommunications space may include a new line function, an add a line function, an upgrade function, a sign in function, an enroll auto pay function, a make payment function, a change address function, a view bill function, a support function, a report issue function and/or a change plan function.

The server 108 may be associated with a telecommunications service provider. The server 108 may be a server computer. Server computers are discussed in more detail hereinafter. In an embodiment, the server 108 comprises a server application 120 stored in a non-transitory memory of the server 108 and executed by a processor of the server 108. The server application 120 may receive the mapping of the functions to the underlying JVMs 114 and applications 116 that support each function. The server application 120 may also obtain the operational statuses of the JVMs 114 and the applications 116 on each of the test servers 102 from the monitoring tools 118 and coalesce or merge the received operational statuses with a corresponding function based on the mapping to create a coalesced operational statuses mapping. The coalesced operational statuses mapping may comprise each function's underlying JVMs and/or applications that enable the function's end-to-end journey and their operational statuses obtained from the monitoring tools 118.

An environment team or a member of an environment team may establish a set of rules. For example, using an electronic device, a user may interact with a management user interface provided by the server application 120 to create the set of rules. Each rule in the set of rules may be associated with one or more functions. In an embodiment, each rule specifies a predefined number of operational JVMs needed in order for the at least one function to be deemed operational. For example, for a given function such as the add a line function, the environment team may specify a rule indicating that at least a certain number of JVMs out of the possible JVMs available to support that function (e.g., 5 out of 10 JVMs, 3 out of 5 JVMS, or some other ratio of JVMs) need to be functioning in order for the add a line function to be deemed operational. The rules can be modified or updated as needed such as by using the management user interface depending on how the test environment 104 is functioning and or how the functions are performing. The set of rules may be stored in a non-transitory memory of the server 108 in a data store such as data store 106.

The server application 120 may apply the set of rules to the coalesced operational statuses mapping and determine whether each the functions is operational based on the application of the set of rules. For instance, continuing with the example given above, if a given rule specifies that at least 5 JVMs of the 10 JVMs need to be functioning in order for the add a line function to be deemed operational, and the coalesced operational statuses mapping indicates that 5 JVMs that support the add a line function are functioning, the server application 120 would determine that the add a line function is currently operational. If, however, the coalesced operational statuses mapping indicates that only 4 JVMs that support the add a line function are functioning, the server application 120 would instead determine that the add a line function is not currently operational. If the server application 120 determines that one of the rules is not met, the server application 120 may provide a notification to an electronic device 110 associated with an environment team. This notification may help to drive quicker corrective action and result in improved functioning and reliability of the test environment 104.

The server application 120 may create a dashboard based on its determinations that illustrates each function and the determined operational status of each function. The application server may provide the dashboard to the electronic device 110. The dashboard will be discussed in more detail below with respect to FIGS. 2A-2C.

The electronic device 110 may comprise a processor 122, a non-transitory memory 124, and a display 126. The electronic device 110 may comprise a general purpose computer, which is described in greater detail hereinafter with respect to FIG. 4. Specifically, the electronic device 110 may be a desktop computer, a laptop computer, a tablet computer, a wearable computer, a mobile telephone, a personal digital assistant (PDA), a portable electronic device, or another network enabled electronic device. The electronic device 110 may display the dashboard on the display 126.

The network 112 promotes communication between the components of the system 100. The network 112 may be any communication network including a public data network (PDN), a public switched telephone network (PSTN), a private network, and/or a combination.

In some embodiments, the test environment availability system 100 may integrate with a test management system 128 that tests applications. The test management system 128 may be a server computer. Server computers are discussed in more detail hereinafter. The test management system 128 running the tests may activate the integrated test environment availability system 100 and only start the test if the integrated test environment availability system 100 determines that the functions implemented by an application under test and the underlying applications that enable the functions are operational. The test management system 128 may monitor and store the statuses provided by the integrated test environment availability system 100 to see the impact different stages of the test has on each of the statuses. The test management system 128 may monitor the integrated test environment availability system 100 and if an element fails to satisfy one of the rules, the test management system 128 may pause or shut down the test, document the statuses from the test and from the integrated test environment availability system 100, and initiates a trouble ticket to investigate the problem. The trouble ticket may be prioritized if the underlying function failing for the application under test supports a large number of applications (e.g., more than a threshold number of applications).

While only described above with respect to one test environment 104, the test environment availability system 100 may comprise a plurality of different test environments with a plurality of test servers as discussed above with respect to the test environment 104. Also, while only one electronic device 110 is illustrated in FIG. 1, the test environment availability system 100 may comprise a plurality of electronic devices 110. For example, the test environment availability system 100 may comprise one or more electronic device associated with application testers and one or more electronic devices associated with environment team members.

Figure 2A:
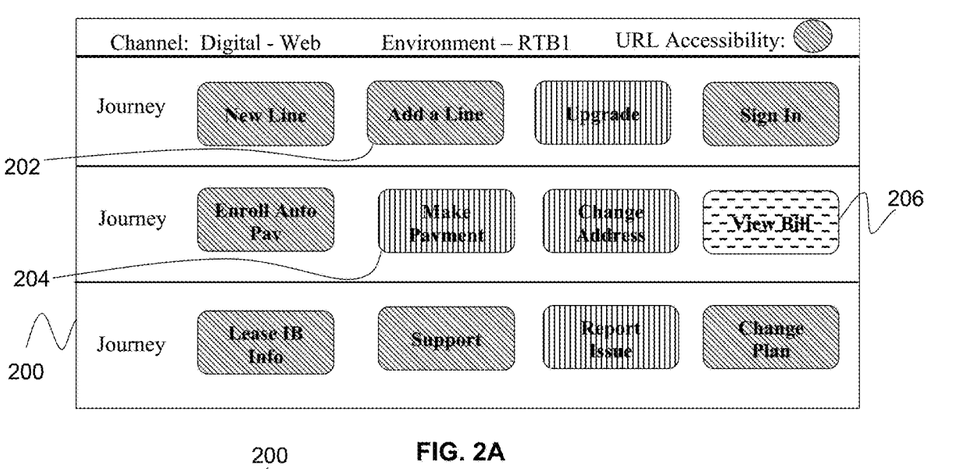
FIGS. 2A, 2B, and 2C illustrate exemplary screenshots of a dashboard according to embodiments of the disclosure.
Figure 2B:
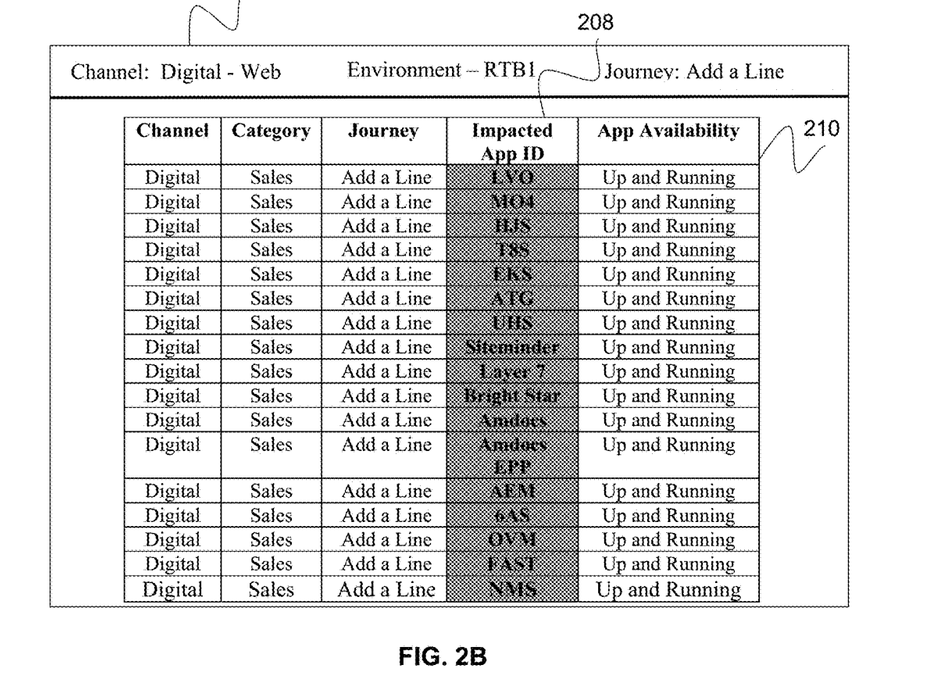
Figure 2C:
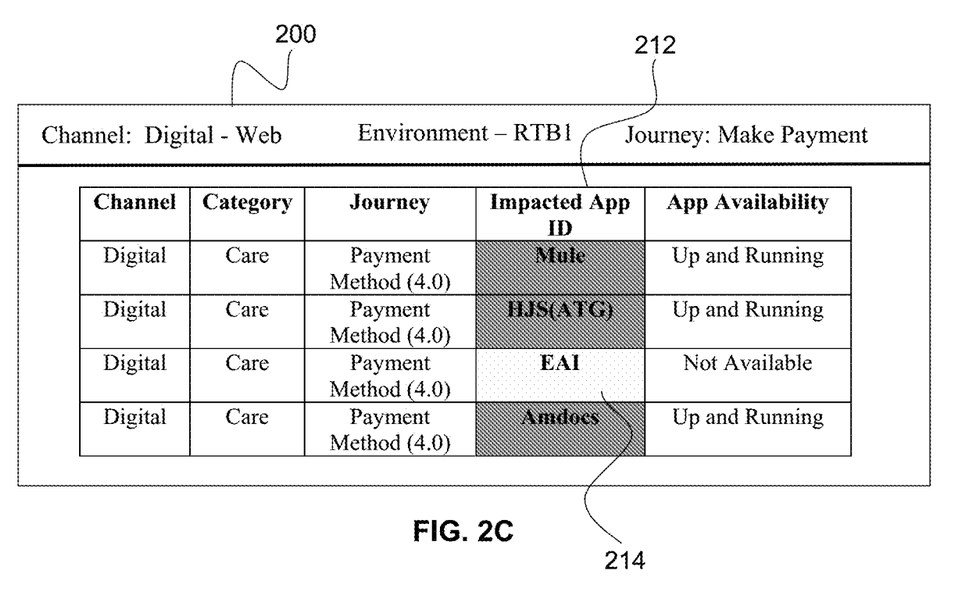

Turning now to FIGS. 2A-2C, exemplary screenshots of a dashboard 200 are provided. Referring first to FIG. 2A, the dashboard 200 created by the server application 120 and provided to the electronic device 110 for display may illustrate a plurality of functions within the test environment 104. The exemplary functions listed in FIG. 2A comprise a new line function, an add a line function, an upgrade function, a sign in function, an enroll auto pay function, a make payment function, a change address function, a view bill function, a lease IB info function, a support function, a report issue function, and a change plan function. The dashboard 200 may include additional or different functions than the ones listed in dashboard 200. Each function may be listed within its own object. While each object is illustrated in the dashboard 200 as having a rounded rectangular shape, the object could comprise any shape without departing from the spirit or scope of the present disclosure.

Each object associated with each function may visually represent the operational status of the function. In some embodiments, this visual representation may be accomplished using different colors. For example, a function that is operational (e.g., the add a line function 202) may be represented in a first color (e.g., green; illustrated here with a diagonal hatching pattern), a function that is not operational (e.g., the make a payment function 204) may be represented in a second color (e.g., red; illustrated here with a vertical hatching pattern), and a function that is not found (e.g., the view bill function 206) may be represented in a third color (e.g., gray; illustrated here with a horizontal dashed hatching pattern). In alternative embodiments, the operational status of each function may be visually represented in other ways such as by the shape of the object, a pattern within the object, a size of the object, or another way.

The objects representing each function in the dashboard 200 may be selectable in order to drill down to the underlying test components (e.g., JVMs 114, applications 116, etc.) that support the end-to-end journey of the selected function. FIGS. 2B and 2C illustrate screenshots that represent this drill down functionality. Referring to FIG. 2B, if the add a line function 202 is selected by a user of the electronic device 110, the server application 120 provides a list of the corresponding underlying applications of the applications 116 that support the add a line function 202 to the dashboard 200. The list may be determined by the server application 120 based on the coalesced operational statuses mapping.

The dashboard 200 may visually represent the operational status of each application as illustrated in column 208. In some embodiments, this visual representation may be accomplished using different colors. For example, an application that is operational may be represented in a first color (e.g., green), an application that is not operational may be represented in a second color (e.g., red), and an application that is not found may be represented in a third color (e.g., gray). Each application listed in FIG. 2B is up and running and is illustrated in green (e.g., illustrated here with a diagonal hatching pattern). In alternative embodiments, the operational status of each function may be visually represented in other ways such as by the shape of the object, a pattern within the object, a size of the object, or another way. The dashboard 200 may also include an application availability column 210 that provides a description of each application's availability.

Referring to FIG. 2C, if the make a payment function 204 is selected by a user of the electronic device 110, the server application 120 provides a list of the corresponding underlying applications of the applications 116 that support the make a payment function 204 to the dashboard 200. The list may be determined by the server application 120 based on the coalesced operational statuses mapping.

The dashboard 200 may visually represent the operational status of each application as illustrated in column 212. As in FIG. 2B, this visual representation may be accomplished using different colors. All but one application listed in FIG. 2C is up and running and is illustrated in green (e.g., illustrated here with a diagonal hatching pattern). One application (i.e., the EAI application 214) listed in FIG. 2C is not available and is illustrated in red (e.g., illustrated here with a vertical hatching pattern). While represented as a table in FIGS. 2B and 2C, in some embodiments, the list of applications that enable the end-to-end journey of the selected function could be presented in a different format.

The dashboard 200 may be periodically updated based on updated statuses obtained from the monitoring tools 118 on each of the test servers 102. As discussed above, the dashboard 200 may also be updated based on updated rules received from the management user interface.

The dashboard 200 generated by the server application 120 may be presented on the display 126 of the electronic device 110 and consulted prior to testing an application to make sure each function implemented by the application about to be tested and those function's underlying components (JVMs 114, applications 116, etc.) are up and running. If the dashboard 200 is consulted prior to testing an application and the dashboard 200 indicates that all of the corresponding functions are up and running, and an issue arises during testing, the tester can more easily identify a source of the issue (e.g., the application under test) as opposed to the testing environment 104 itself and escalate the issue to the proper team, thereby resulting in improved testing efficiency and quicker resolutions for testing issues.

The dashboard 200 may be consulted after initially testing an application instead of consulting the dashboard 200 ahead of testing or in addition to consulting the dashboard 200 ahead of testing. If an issue arises during testing of an application and the dashboard 200 is consulted thereafter, the tester will be able to more easily identify a source of the issue. For example, if the dashboard 200 indicates that all of the corresponding functions are up and running, the source of the issue will likely be the application under test whereas if one or more of the corresponding functions is not up and running, the source of the issue will likely be the test environment 104. Regardless of whether the dashboard 200 is consulted ahead of testing or after testing, since the dashboard helps to identify the proper source of an issue as discussed above, the dashboard 200 eliminates some of the incorrect complaints or trouble tickets and enables improved efficiency in application testing.

The dashboard 200 also enables more efficient scheduling of maintenance, updates, or outages for the underlying test environment components, which also contributes to improved functioning and reliability of the test environments. For example, a user can consult the dashboard 200 to understand the impacts (e.g., what functions are impacted) if an application is temporarily out of service for maintenance and determine who needs to be notified if an application is going to go into maintenance. In another example, the dashboard 200 may be consulted to determine what functions and the underlying applications are affected if a test environment is temporarily taken down.

Figure 3:
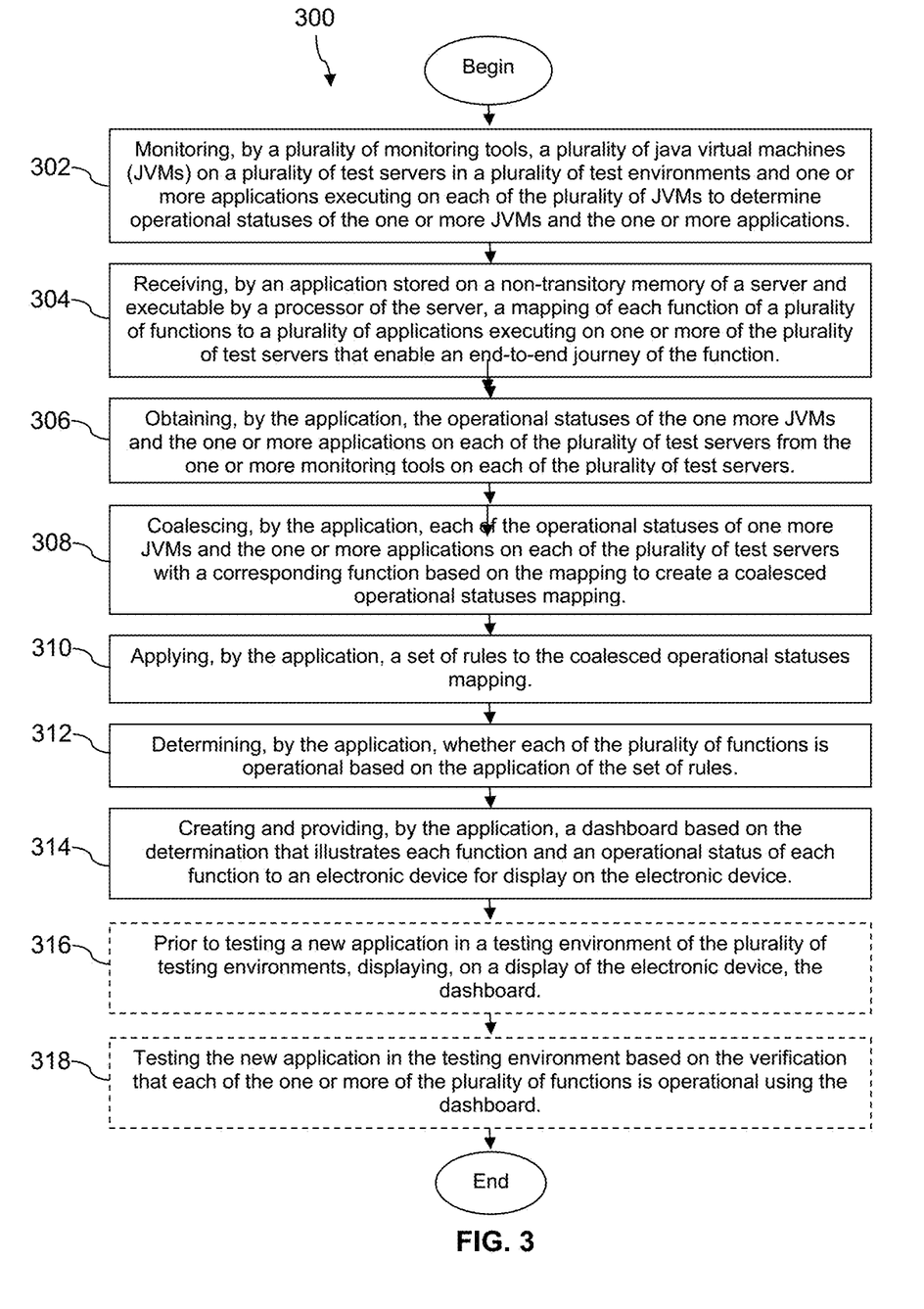
FIG. 3 is a flow chart of a method according to an embodiment of the disclosure.

Turning now to FIG. 3, a method 300 is described. At block 302, a plurality of monitoring tools (e.g., monitoring tools 118) monitor a plurality of java virtual machines (JVMs) (e.g., JVMs 114) on a plurality of test servers (e.g., test servers 102) in a plurality of test environments (e.g., test environments 104) and one or more applications (e.g., applications 116) executing on each of the plurality of JVMs to determine operational statuses of the one or more JVMs and the one or more applications. At block 304, an application (e.g., server application 120) stored on a non-transitory memory of a server (e.g., server 108) and executable by a processor of the server, receives a mapping of each function of a plurality of functions to a plurality of applications executing on one or more of the plurality of test servers that enable an end-to-end journey of the function. At block 306, the operational statuses of the one more JVMs and the one or more applications on each of the plurality of test servers are obtained from the one or more monitoring tools on each of the plurality of test servers.

At block 308, the application coalesces each of the operational statuses of one more JVMs and the one or more applications on each of the plurality of test servers with a corresponding function based on the mapping to create a coalesced operational statuses mapping. At block 310, the application applies a set of rules to the coalesced operational statuses mapping. At block 312, the application determines whether each of the plurality of functions is operational based on the application of the set of rules. At block 314, the application creates and provides a dashboard based on the determination that illustrates each function and an operational status of each function to an electronic device for display on the electronic device.

In some embodiments, the method 300 includes additional steps. For example, at block 316, prior to testing a new application in a testing environment of the plurality of testing environments, the dashboard may be displayed on a display (e.g., display 126) of the electronic device (e.g., electronic device 110). In another example of a potential additional step, at block 318, the new application is tested in the testing environment based on the verification that each of the one or more of the plurality of functions is operational using the dashboard.

Figure 4:
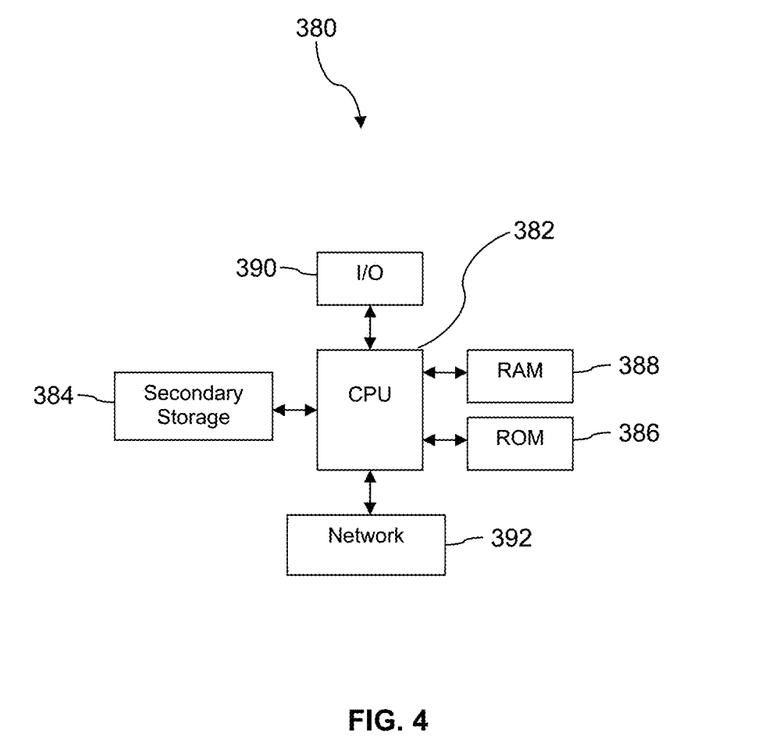
FIG. 4 is block diagram of a computer system according to an embodiment of the disclosure.

FIG. 4 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well-known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well-known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

Additionally, after the system 380 is turned on or booted, the CPU 382 may execute a computer program or application. For example, the CPU 382 may execute software or firmware stored in the ROM 386 or stored in the RAM 388. In some cases, on boot and/or when the application is initiated, the CPU 382 may copy the application or portions of the application from the secondary storage 384 to the RAM 388 or to memory space within the CPU 382 itself, and the CPU 382 may then execute instructions that the application is comprised of. In some cases, the CPU 382 may copy the application or portions of the application from memory accessed via the network connectivity devices 392 or via the I/O devices 390 to the RAM 388 or to memory space within the CPU 382, and the CPU 382 may then execute instructions that the application is comprised of. During execution, an application may load instructions into the CPU 382, for example load some of the instructions of the application into a cache of the CPU 382. In some contexts, an application that is executed may be said to configure the CPU 382 to do something, e.g., to configure the CPU 382 to perform the function or functions promoted by the subject application. When the CPU 382 is configured in this way by the application, the CPU 382 becomes a specific purpose computer or a specific purpose machine.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards that promote radio communications using protocols such as code division multiple access (CDMA), global system for mobile communications (GSM), long-term evolution (LTE), worldwide interoperability for microwave access (WiMAX), near field communications (NFC), radio frequency identity (RFID), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well-known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), flash drive, ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method for test environment availability, comprising:
monitoring, by a plurality of monitoring tools, a plurality of JAVA virtual machines (JVMs) on a plurality of test servers in a plurality of test environments and one or more applications executing on each of the plurality of JVMs to determine operational statuses of the one or more JVMs and the one or more applications;
receiving, by an application stored on a non-transitory memory of a server and executable by a processor of the server, a mapping of each function of a plurality of functions to a plurality of applications executing on one or more of the plurality of test servers that enable an end-to-end journey of the function;
obtaining, by the application, the operational statuses of the one more JVMs and the one or more applications on each of the plurality of test servers from the one or more monitoring tools on each of the plurality of test servers;
coalescing, by the application, each of the operational statuses of one more JVMs and the one or more applications on each of the plurality of test servers with a corresponding function based on the mapping to create a coalesced operational statuses mapping;
applying, by the application, a set of rules to the coalesced operational statuses mapping, wherein the set of rules comprises a rule for at least one function that specifies a predefined number of operational JVMs needed in order for the at least one function to be deemed operational;
determining, by the application, whether each of the plurality of functions is operational based on the application of the set of rules;

creating and providing, by the application, a dashboard based on the determination that illustrates each function and an operational status of each function to an electronic device for display on the electronic device;
prior to testing a new application in a testing environment of the plurality of testing environments, displaying, on a display of the electronic device, the dashboard, wherein the new application comprises one or more of the plurality of functions, and wherein the operational status of each of the one or more plurality of functions is verified to be operational based on the dashboard;
testing the new application in the testing environment based on the verification that each of the one or more of the plurality of functions is operational using the dashboard;
creating and providing, by the application, a management user interface to an electronic device associated with an environment team;
receiving, by the application, a revised rule for the at least one function as an input to the management user interface, wherein the revised rule specifies a different predefined number of operational JVMs needed in order for the at least one function to be deemed operational; and
updating, by the application, the dashboard based on the revised rule.

2. The method of claim 1, further comprising scheduling maintenance for one of the plurality of test servers in one of the plurality of test environments or one of the one or more applications executing on one of the plurality of JVMs based on the dashboard.

3. The method of claim 1, providing, by the application, a notification to an electronic device associated with an environment team based on the application of the set of rules when a number of JVMs associated with the at least one function falls below the predefined number of operational JVMs specified in the rule.

4. The method of claim 1, wherein the operational status of each function comprises operational, not operational, or not found, and wherein the dashboard illustrates the operational status of each function using a different color for different operational statuses.

5. A test environment availability system, comprising:
a plurality of test servers in a plurality of test environments, wherein each test server of the plurality of test servers comprises:
one or more JAVA virtual machines (JVMs);
one or more applications executing on the one or more JVMs; and
one or more monitoring tools associated with the one or more JVMs, wherein the one or more monitoring tools monitor the one or more JVMs and the one or more applications to determine operational statuses of the one or more JVMs and the one or more applications; and
a server comprising:
a processor;
a non-transitory memory; and
an application stored in the non-transitory memory, that when executed by the processor:
receives a mapping of each function of a plurality of functions to a plurality of applications executing on one or more of the plurality of test servers that enable an end-to-end journey of the function,
obtains the operational statuses of the one more JVMs and the one or more applications on each of the plurality of test servers from the one or more monitoring tools on each of the plurality of test servers,
coalesces each of the operational statuses of one more JVMs and the one or more applications on each of the plurality of test servers with a corresponding function based on the mapping to create a coalesced operational statuses mapping,
applies a set of rules to the coalesced operational statuses mapping, wherein the set of rules comprises a rule for at least one function that specifies a predefined number of operational JVMs needed in order for the at least one function to be deemed operational,
determines whether each of the plurality of functions is operational based on the application of the set of rules, and
creates and provides a dashboard based on the determination that illustrates each function and an operational status of each function to an electronic device for display on the electronic device, wherein the dashboard is updated based on a revised set of rules, and wherein the revised set of rules comprises a revised rule for the at least one function that specifies a different predefined number of operational JVMs needed in order for the at least one function to be deemed operational.

6. The system of claim 5, wherein the operational status of each function comprises operational, not operational, or not found.

7. The system of claim 5, wherein the dashboard illustrates the operational status of each function using a different color for different operational statuses.

8. The system of claim 5, wherein each function in the dashboard is selectable and in response to receiving an input selecting a function of the plurality of functions, the application provides a list of the plurality of applications that enable the end-to-end journey of the selected function and an operational status of each of the plurality of applications based on the coalesced operational statuses mapping.

9. The system of claim 8, wherein the dashboard illustrates the operational status of each application of the plurality of applications using a different color for different operational statuses.

10. The system of claim 5, wherein the application further provides a notification to an electronic device associated with an environment team based on the application of the set of rules when a number of JVMs associated with the at least one function falls below the predefined number of operational JVMs specified in the rule.

11. The system of claim 5, wherein the dashboard is periodically updated based on updated statuses obtained from the one or more monitoring tools on each of the plurality of test servers.

12. A method for test environment availability, comprising:
monitoring, by a plurality of monitoring tools, a plurality of JAVA virtual machines (JVMs) on a plurality of test servers in a plurality of test environments and one or more applications executing on each of the plurality of JVMs to determine operational statuses of the one or more JVMs and the one or more applications;
receiving, by an application stored on a non-transitory memory of a server and executable by a processor of the server, a mapping of each function of a plurality of functions to a plurality of applications executing on one or more of the plurality of test servers that enable an end-to-end journey of the function;

obtaining, by the application, the operational statuses of the one more JVMs and the one or more applications on each of the plurality of test servers from the one or more monitoring tools on each of the plurality of test servers;

coalescing, by the application, each of the operational statuses of one more JVMs and the one or more applications on each of the plurality of test servers with a corresponding function based on the mapping to create a coalesced operational statuses mapping;

applying, by the application, a set of rules to the coalesced operational statuses mapping, wherein the set of rules comprises a rule for at least one function that specifies a predefined number of operational JVMs needed in order for the at least one function to be deemed operational;

determining, by the application, whether each of the plurality of functions is operational based on the application of the set of rules;

creating and providing, by the application, a dashboard based on the determination that illustrates each function and an operational status of each function to an electronic device for display on the electronic device;

creating and providing, by the application, a management user interface to an electronic device associated with an environment team;

receiving, by the application, a revised rule for the at least one function as an input to the management user interface, wherein the revised rule specifies a different predefined number of operational JVMs needed in order for the at least one function to be deemed operational; and updating, by the application, the dashboard based on the revised rule.

13. The method of claim 12, wherein the operational status of each function comprises operational, not operational, or not found.

14. The method of claim 12, wherein the dashboard illustrates the operational status of each function using a different color for different operational statuses.

15. The method of claim 12, further comprising displaying the dashboard on a display of the electronic device.

16. The method of claim 15, wherein each function in the dashboard is selectable, the method further comprising:

receiving, by the electronic device, an input selecting a function of the plurality of functions;

receiving, by electronic device from the application, a list of the plurality of applications that enable the end-to-end journey of the selected function and an operational status of each of the plurality of applications based on the coalesced operational statuses mapping; and displaying the list of the plurality of applications on the display of the electronic device.

17. The method of claim 16, wherein the operational status of each application of the plurality of applications is represented using a different color for different operational statuses.

18. The method of claim 12, further comprising providing, by the application, a notification to an electronic device associated with an environment team based on the application of the set of rules when a number of JVMs associated with the at least one function falls below the predefined number of operational JVMs specified in the rule.

* * * * *